(12) United States Patent
Rolland et al.

(10) Patent No.: US 8,275,310 B2
(45) Date of Patent: Sep. 25, 2012

(54) WIRELESS SYSTEM FOR TRANSMITTING DATA BETWEEN A BASE STATION AND A RELAY ANTENNA OF A MOBILE TELEPHONY NETWORK

(75) Inventors: Alain Rolland, Quincy Sous Senart (FR); Stéphane Blanc, Breuillet (FR); Jean-Christophe Plumecoq, Palaiseau (FR)

(73) Assignee: E-Blink, Boussy Saint Antoine (FR)

( * ) Notice: Subject to any disclaimer, the term of this patent is extended or adjusted under 35 U.S.C. 154(b) by 355 days.

(21) Appl. No.: 12/439,837

(22) PCT Filed: Sep. 3, 2007

(86) PCT No.: PCT/FR2007/051867
§ 371 (c)(1),
(2), (4) Date: Oct. 6, 2009

(87) PCT Pub. No.: WO2008/029055
PCT Pub. Date: Mar. 13, 2008

(65) Prior Publication Data
US 2010/0056162 A1    Mar. 4, 2010

(30) Foreign Application Priority Data
Sep. 4, 2006   (EP) .................................. 06291394

(51) Int. Cl.
*H04B 7/15*     (2006.01)
*H04B 7/185*    (2006.01)
*H04W 40/00*    (2009.01)
*H04M 1/00*     (2006.01)

(52) U.S. Cl. .................... 455/11.1; 455/445; 455/562.1; 370/316

(58) Field of Classification Search ................. 455/445, 455/83, 562.1, 575.7, 7, 11.1, 13.1, 16; 370/315, 370/316
See application file for complete search history.

(56) References Cited

U.S. PATENT DOCUMENTS

| | | | |
|---|---|---|---|
| 5,652,765 A * | 7/1997 | Adachi et al. ................. | 375/211 |
| 6,049,315 A * | 4/2000 | Meyer ........................... | 343/895 |
| 6,339,611 B1 * | 1/2002 | Antonio et al. ............... | 375/130 |
| 6,385,435 B1 * | 5/2002 | Lee ................................ | 455/24 |
| 6,603,956 B1 * | 8/2003 | Shin ............................. | 455/11.1 |
| 6,904,266 B1 * | 6/2005 | Jin et al. ........................ | 455/20 |
| 7,463,673 B2 | 12/2008 | Fujii et al. | |
| 2004/0166802 A1 | 8/2004 | McKay, Sr. et al. | |
| 2005/0130587 A1 * | 6/2005 | Suda et al. ........................ | 455/9 |
| 2006/0068848 A1 * | 3/2006 | Shapira et al. ............. | 455/562.1 |
| 2006/0205343 A1 * | 9/2006 | Runyon et al. ............... | 455/11.1 |

* cited by examiner

*Primary Examiner* — Christopher M Brandt
(74) *Attorney, Agent, or Firm* — Leydig, Voit & Mayer, Ltd.

(57) ABSTRACT

The invention relates to a wireless system for transmitting data between a base station and a relay antenna of a mobile telephony network. A link comprises, for the separating of the channels, two filters having a lower isolation than a total predetermined isolation and the antennas are dual-polarization antennas, each polarization being allocated to one of the two channels. The isolation provided by the filters and the antenna are added together to obtain the total predetermined isolation.

4 Claims, 3 Drawing Sheets

WIRELESS SYSTEM FOR TRANSMITTING DATA BETWEEN A BASE STATION AND A RELAY ANTENNA OF A MOBILE TELEPHONY NETWORK

FIELD OF THE INVENTION

The invention relates to a wireless data transmission system between a base station and a relay antenna of a mobile telephone network of the type comprising at least one bidirectional link, which includes at least one route provided with a transmission channel and a reception channel for electromagnetic signals and with means for frequency-isolating the channels, to the relay antenna and to the base station being respectively associated with an electronic device provided with an antenna.

BACKGROUND

In bidirectional communications system of this type, the frequency isolation should be of the order of 90 dB. In order to meet this requirement, the use of duplexers with a metal cavity is known. These advantageous duplexers, because of their larger isolation between the channels, have major drawbacks of having a very large weight and volume.

The object of the invention is to find a remedy to these drawbacks.

SUMMARY OF THE INVENTION

In order to attain this goal, the bidirectional communications system according to the invention is characterized in that an aforementioned link includes for separating the channels of one route, two filters having an isolation less than the total predetermined isolation and in that the antennas are antennas with dual polarization, each for one channel, and in that the isolations provided by the filter and the antenna add up together in order to obtain the total predetermined isolation.

Other characteristics of the invention are indicated in the dependent claim.

BRIEF DESCRIPTION OF DRAWING FIGURES

The invention will be better understood, and other objects, characteristics, details and advantages thereof will become more clearly apparent in the explanatory description which follows, made with reference to the appended schematic drawings only given as an example illustrating several embodiments of the invention and wherein.

DETAILED DESCRIPTION

Figure 1:
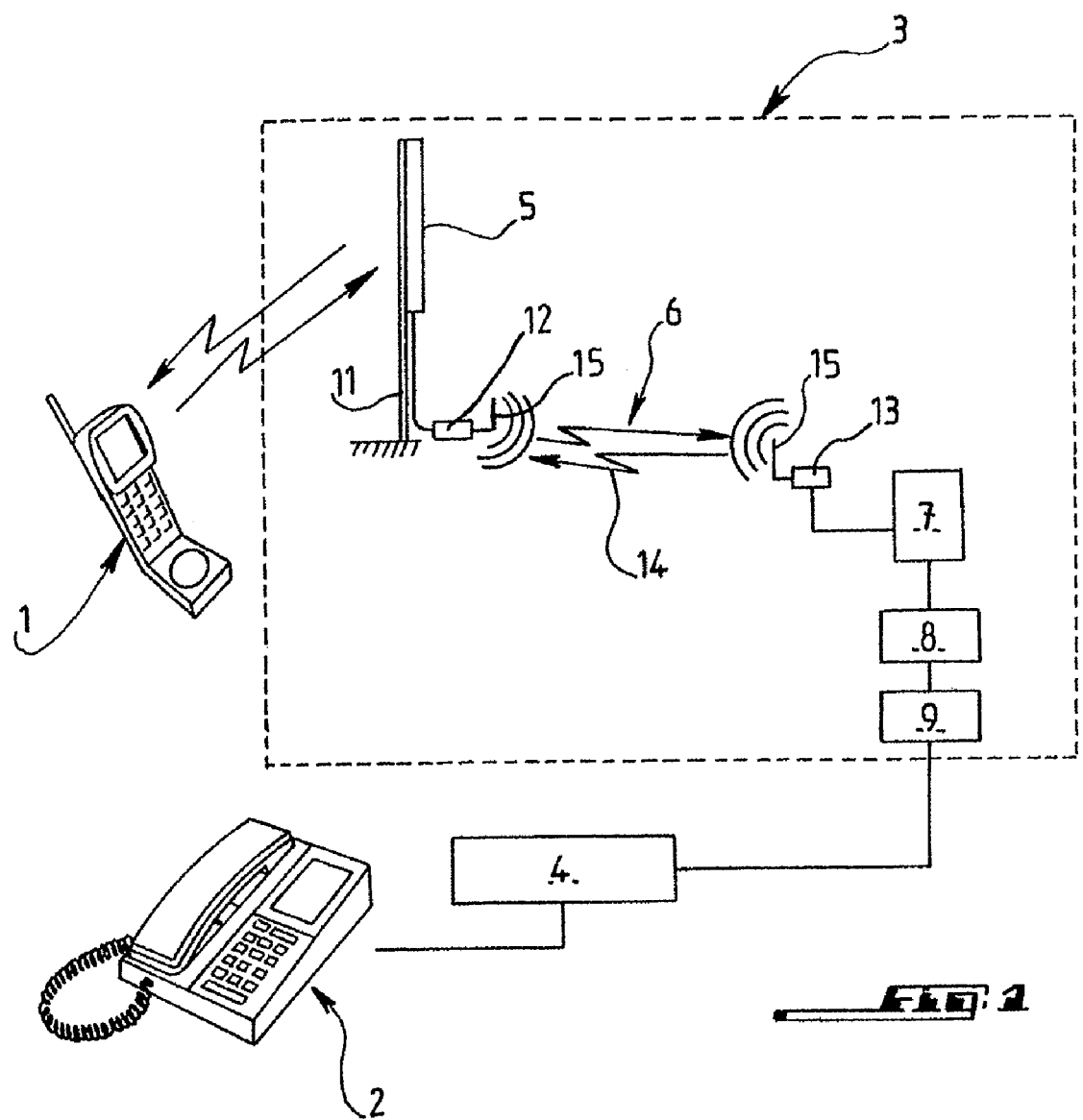
FIG. 1 is a schematic view illustrating a wireless transmission system between a base station according to the invention and a relay antenna of a mobile telephone network according to the invention.

FIG. 1 illustrates a communications system between a mobile telephone 1 and a fixed telephone 2 via a mobile telephone network 3 and a fixed network 4. Inside the mobile telephone network 3, the communication passes through a relay antenna 5 intended to communicate with the mobile telephone 1, a wireless data transmission link 6 and a radio-communications rack 7 generally called BTS (Base Transceiver System) of a fixed base station which further includes a base control station 8 commonly called BSC (Base Station Controller) and a communications center 9 called MSC (Mobile Switching Center).

The relay antenna 5 is supported by a mast 11, for example, mounted on the terrace of a building. The link between the antenna 5 and the radiocommunications rack 7 is a radiofrequency link. Wireless transmission, more specifically takes place between an electronic equipment device located at the foot of the mast 11 of the antenna, enclosed in a casing 12 and an electronic equipment device enclosed in a casing 13 associated with the communications rack 7. The antenna 12 and rack casings 13 include transmitter and receiver antenna means 15 for the signals to be transmitted.

Such a communications system is described in International Patent Application WO 2005/051017.

Figure 2:
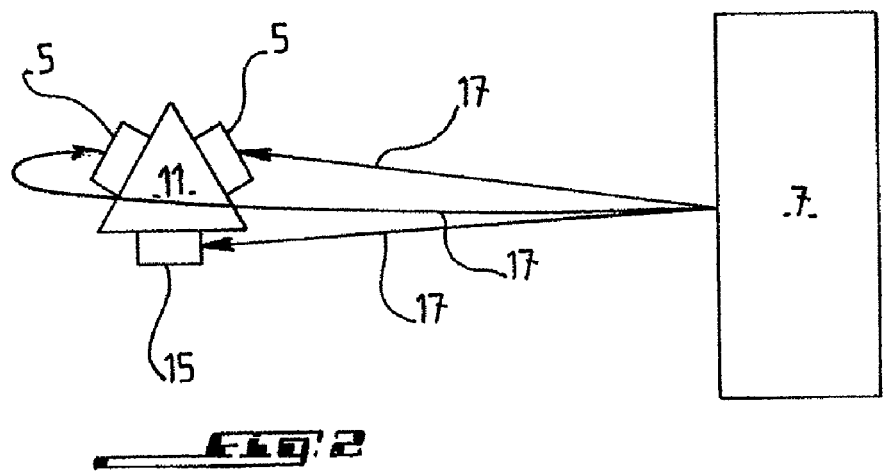
FIG. 2 is a schematic view of a base station including a radiocommunications rack and three antennas each connected to the rack via a bidirectional operational link of the operator.

A link between the antenna 5 and the BTS device 7 is a bidirectional link which includes at least one route, but generally two routes, i.e. a main route and a diversity route. FIG. 2 shows a base station in which the BTS device 7 is connected to three antennas 5 placed on a tower 11, each time via an aforementioned bidirectional link with two routes, noted as 17. The three antennas may belong to one operator. The antennas may be multifrequency antennas, for example, for transmitting two to four frequency bands. The number of signals passing on this site of the base station is then multiplied by the number of frequency bands. It is possible that a second operator also using several frequency bands sets himself up on the same site. In this case, the tower 11 will bear three other antennas 5 and the number of signals passing on this site would be accordingly increased.

It is known that in a transmission and reception bidirectional communications system including a single antenna 15, for separating the transmission EX and reception RX channels of a bidirectional route 17, a duplexer has to be used for guaranteeing sufficient frequency isolation. The required isolation between both channels should be equal to 90 dB. This requirement is met up to now by using duplexers with a metal cavity.

An essential characteristic of the invention lies in the replacement of duplexers of this type, which are heavy and bulky, with an architecture comprising an EX filter, a RX filter and an additional EX/RX separation device. With this architecture, bandpass filters may be used having lower isolations and therefore low cost and low volume technologies, such as for example surface wave filters known under the designation of SAW, and the microstrip technology filters called striplines. The typical isolation produced by these filters is about 40 to 60 dB. The additional separation device should therefore have an isolation larger than or equal to 30 dB. According to the invention, this additional isolation should be advantageously achieved by the actual antenna 15 if this antenna is a dual polarization antenna such as an antenna with vertical and horizontal linear polarizations, each polarization being assigned to one of the two channels to be separated.

Figure 3:
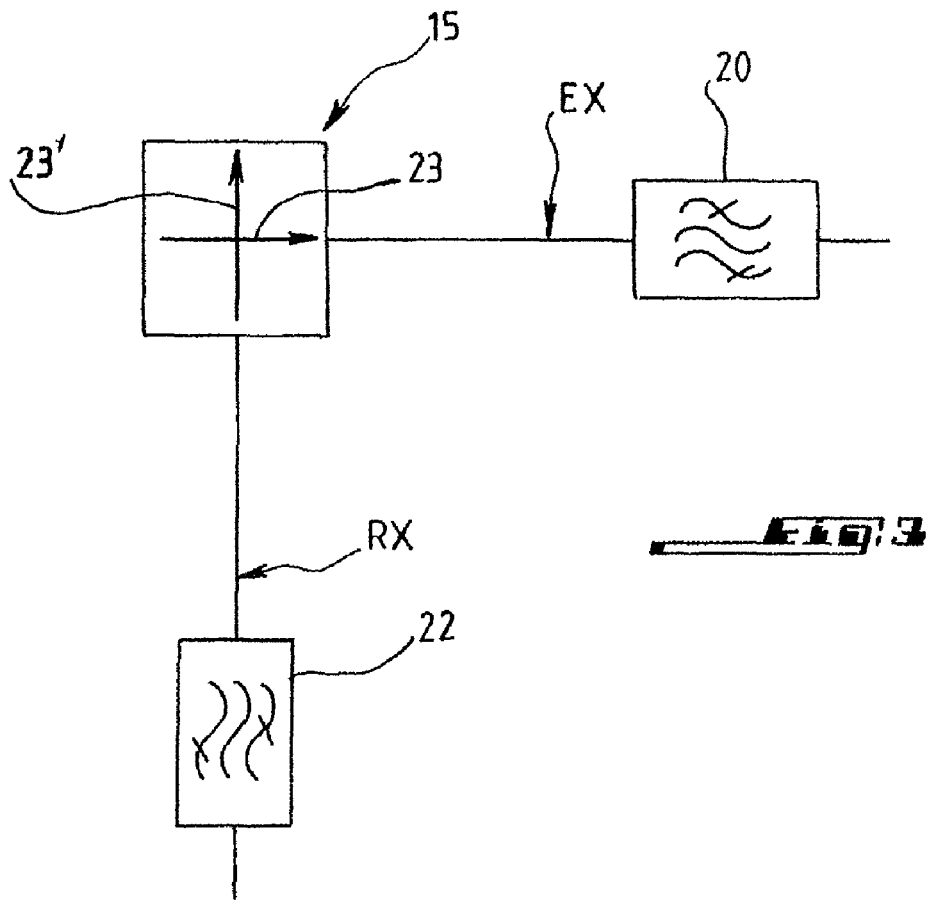
FIG. 3 is a schematic illustration of a filter device according to the invention.

FIG. 3 schematically illustrates such a separation assembly. The transmission EX channel is provided with a low cost bandpass filter 20 of low bulkiness and the reception channel RX is provided with a corresponding bandpass filter 22. The antenna with dual polarization 15 is mounted in both channels EX and RX, a polarization materialized by the arrow 23 being assigned to the EX route while the other polarization symbolized by the arrow 23' is associated with the RX route.

Figure 4:
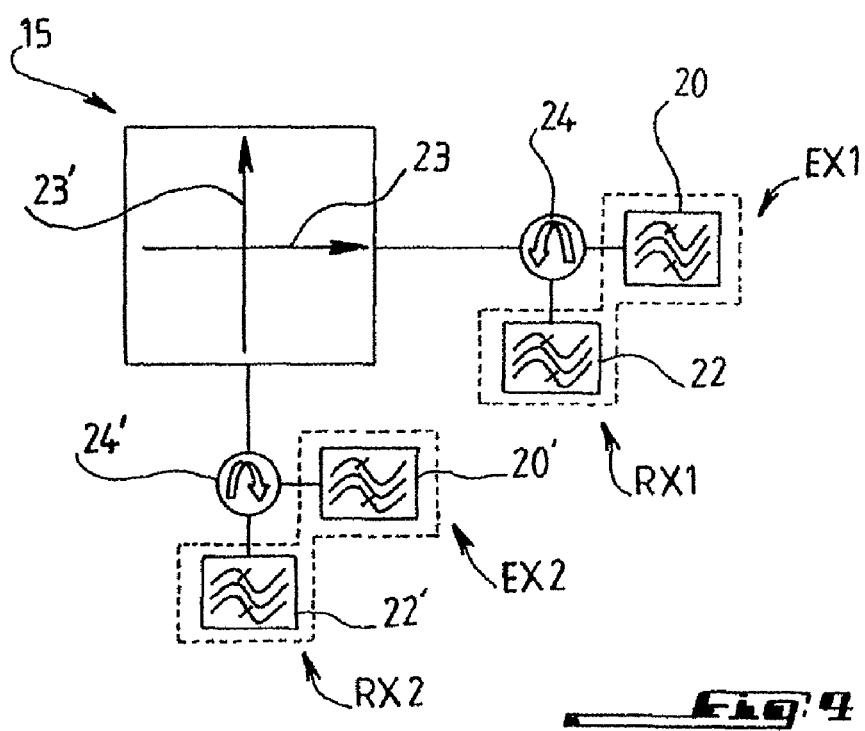
FIG. 4 is a schematic view of a filter device according to the invention for a bidirectional link including main and diversity routes.

FIG. 4 illustrates a filtering architecture according to the invention which may be used in the case of an application as already mentioned above, in which a bidirectional link 17 includes two routes, i.e. a main route and a diversity route, each route including a transmission EX channel and a reception RX channel.

Instead of using two bipolarization antennas, i.e. with two polarizations, each for the EX and RX channels of one route, the invention proposes with FIG. 4 a solution which only requires a bipolarization antenna 15, a circulator 24 and two filters 20, 22 for one route, for example a route called a main route including the EX1, RX1 channels and a circulator 24' and two filters 20', 22' for the second route known as the diversity route, a filter being positioned in each of the EX2 and RX2 channels. With the invention, it is thus possible to directly transmit on a same frequency band the main EX1 and RX1 routes and the diversity routes EX2 and RX2 because they are of different polarizations.

Given that each circulator provides an isolation of 30 dB, a EX1/RX1 or EX2/RX2 isolation of 70-90 dB is obtained, i.e. an isolation of 40-60 dB provided by the filters 20 and 22 and 20' and 22' and an additional 30 dB isolation provided by the respective circulator 24, 24'. The EX1/EX2 or RX1/RX2 isolation is of 30 dB, i.e. the isolation due to both polarizations of the antenna. The EX1/RX2 or EX2/RX1 isolation is 100-120 dB, i.e. the sum of the isolations produced by the filters, the circulator and the antenna.

According to another essential characteristic of the invention, the filtering architecture according to the invention which has just been described, allows, in combination with the use of a dual frequency change as described in International Patent Application 2005/051017, a reduction in the number of required duplexers according to the state of the art.

Figure 5:
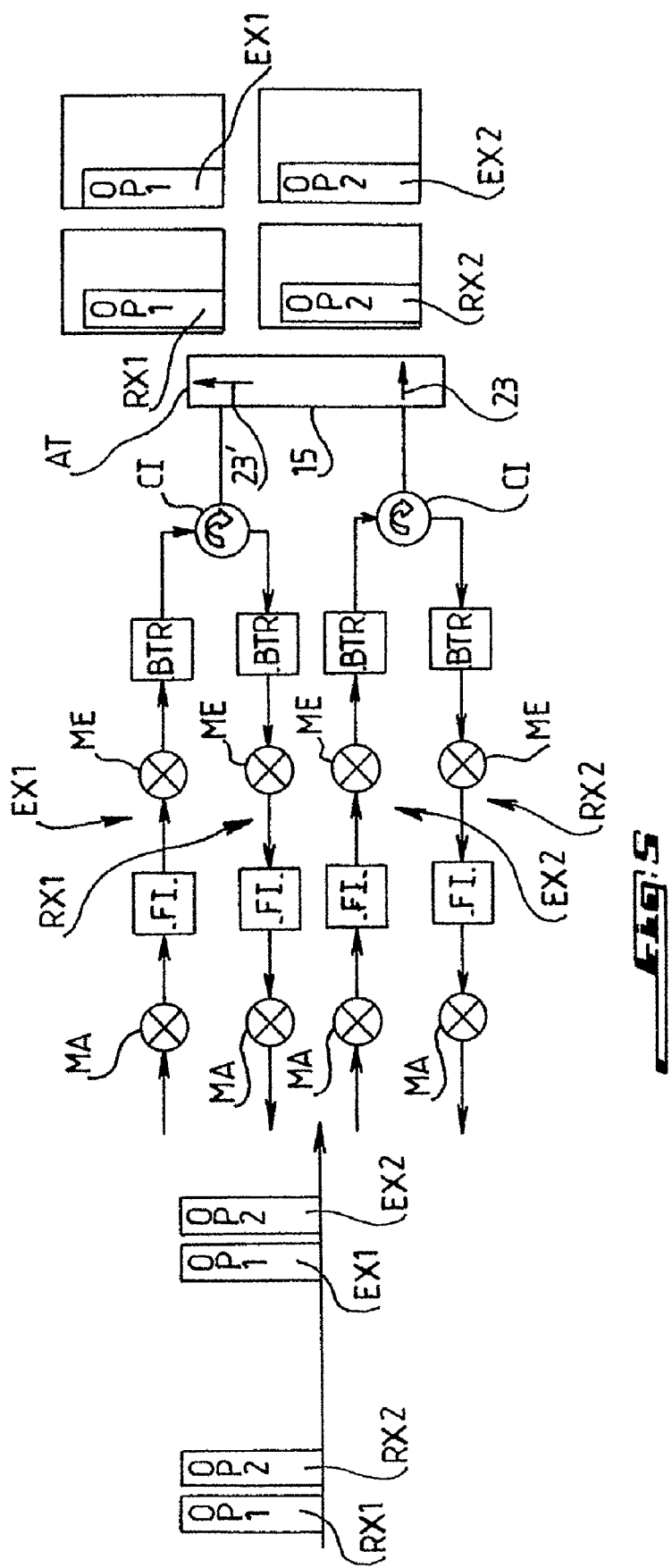
FIG. 5 is a schematic view of an application of the system according to the invention.

FIG. 5 illustrates this advantageous characteristic of the invention for a case of an application involving the use of two operator frequency bands OP1, OP2 which have to be transposed to a transmission band BTR, with higher frequencies than the frequencies of the operator bands. It should be noted that the process for transposing the bands is carried out in the electronic casing 13 of the base station.

FIG. 5 shows a system for transposing frequencies of the frequency bands or routes of a plurality of operators, in the illustrated example of two operator routes OP1, OP2, each of which includes an EX channel and an RX channel, at a transmission band BTR level which may comprise one or more bands, each provided with sub-bands for receiving the EX and RX channels of the operator routes.

It is apparent from FIG. 5 that, in the frequency spectrum of the operator routes, the RX channels of the operators are juxtaposed and thereby grouped, and equally the EX channels. The RX channels may be placed in a range of frequencies comprised between 1,900 MHz and 1,980 MHz while the EX channels may be placed in a range comprised between 2,100 and 2,180 MHz. A transmission band BTR might extend from 2,400 MHz to 2,483 MHz.

The frequency transposition system according to FIG. 5 comprises for each RX, EX channel of an operator route, a mixer MA for lowering frequencies to an intermediate frequency and a mixer ME for raising the frequencies from the intermediate frequency level to the transmission band BTR level. In each channel, an intermediate frequency FI filter is positioned between a frequency-lowering mixer MA and frequency-raising mixer ME.

The frequency bands of the EX and RX channels of the operators may be the same, for example, 10 MHz for a central intermediate frequency of 100 MHz, or be different. Selection of the filters FI will be made accordingly. The mixers include local oscillators selected depending on the frequency transpositions which have to be performed.

As illustrated in FIG. 4, the frequency transposition system according to the invention must provide separation of the EX and RX channels of each route by means of two filters, such as the filters 20 and 22 and/or a circulator CI such as the circulator 24. As on the side of the operator routes, the RX and EX channels are also grouped by respective juxtaposition at the transmission bands BTR. Because of the frequency transpositions of each RX and EX channel by means of two mixers and therefore of two local oscillators and an intermediate filter FI, the channels may be placed in the suitable sub-bands of a transmission band BTR. But, according to FIG. 4, the EX and RX channels have to be separated in frequency, by means of two bandpass filters. The width of the passband of each filter is selected to contain the whole of the RX or EX channels. Therefore, only two types of filters are required at a transmission band BTR. The number of types of FI filters on the other hand depends on the number of the different bandwidths of the EX and RX channels of the operator bands.

As an example, in the case of three operator bands and four possible bandwidths, the frequency transposition system according to FIG. 5 only requires six types of filters, four types of intermediate frequency filters, and two types of filters on the side of the transmission bands BTR. As a comparison, a design of transposition systems without lowering to an intermediate frequency, i.e. only using direct transposition mixers at the operator routes at the higher frequency of the transmission band BTR would only require 24 types of filters in this case of design.

It should be noted that this last design may lead to development of filters which are technically difficult to produce because these have to be band filters with selectivity less than 1% relatively to the central frequency with strong rejections. Within the scope of the design illustrated in FIG. 5, in the case of intermediate filters FI with a central frequency of 100 MHz and a width of 10 MHz, these filters FI only have bands of less than 10% of the central frequency and may then be "standard" filters.

With the transmission system according to the invention, as illustrated in FIG. 5, based on a frequency transposition passing through an intermediate frequency, it is possible to choose the operator frequency by selecting the local oscillator of the frequency-lowering mixer and the BTR frequency by selecting the local oscillator of the frequency-raising mixer. A single type of filter is required at the transmission band. In other words, the invention accomplishes sub-band filtering with the intermediate frequency filter.

Again referring back to FIG. 5, it is seen that the RX and TX channels of the operator OP1 are set on one polarization of the antenna AT and the RX and EX channels of the operator OP2 on the other polarization of the antenna, the RX channels being in the same frequency band, but separated by the fact that they have different polarizations.

In the case of three or four operators, the RX channels will be placed in the suitable sub-bands of the transmission band BTR and equally the EX channels. In the frequency spectrum of the antenna, the channels of the additional operators would then be placed beside the illustrated channels, the channels of the third operator, for example, beside the RX1 and EX1 channels and the channels of the possible fourth operator then beside the RX2 and EX2 channels. Anyhow, the use of both polarizations of the antenna provides a reduction in the width of the frequency spectrum of the antenna.

The invention claimed is:

1. A wireless data transmission system for communication between a base station and a relay antenna of a mobile telephone network, comprising:
   at least one bidirectional link which includes at least two routes, each route including at least one transmission channel and one reception channel for electromagnetic signals; and
   at least one frequency isolation unit for separating channels in frequency, wherein
      the link comprises a first electronic device including a first antenna associated with the relay antenna and a second electronic device including a second antenna associated with the base station,
      the frequency isolation unit includes a first filter and a second filter, wherein the first filter and the second filter provide an isolation less than a total predetermined isolation,
      the first antenna provides two polarizations of electromagnetic signals,
      the second antenna provides two polarizations of electromagnetic signals,
      the isolation provided by the first filter, the second filter, and one of the first antenna and the second antenna add to produce the total predetermined isolation,
      one polarization of the first and second antennas is assigned to the transmission channel and the reception channel of one route,
      the other polarization of the first and second antennas is assigned to the transmission channel and the reception channel of the other route, and
      each route includes a separator unit providing separation from additional channels.

2. The system according to claim 1, wherein the separator unit is a circulator.

3. The system according to claim 1, wherein at least one of the first and second filters is selected from the group consisting of surface wave filters and micro-strip filters.

4. The system according to claim 1, wherein
   several operator bands are transposed to at least one transmission band of higher frequency, and
   the system further comprises a frequency transposition device including
      an intermediate filter for each channel;
      at least one first mixer for lowering frequency;
      at least one second mixer for raising frequency;
      a first filter for each transmission channel;
      a second filter for each reception channel; and
      at least one circulator.

* * * * *